Sept. 2, 1941.    L. BERTELE    2,254,511
PHOTOGRAPHIC OBJECTIVE
Filed March 8, 1940
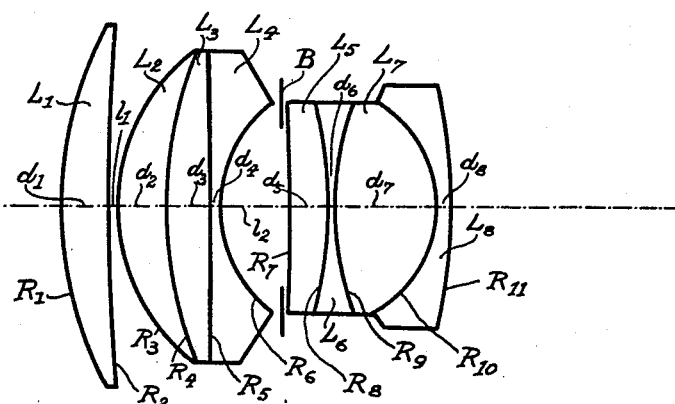
INVENTOR.
Ludwig Bertele
BY Singer, Ehlert, Stern & Carlberg
ATTORNEYS Patented Sept. 2, 1941

2,254,511

UNITED STATES PATENT OFFICE 2,254,511

PHOTOGRAPHIC OBJECTIVE

Ludwig Bertele, Dresden, Germany, assignor to Zeiss Ikon Aktiengesellschaft, Dresden, Germany Application March 8, 1940, Serial No. 323,017
In Germany February 28, 1939

4 Claims. (Cl. 88—57)

The invention relates to improvements in photographic objectives having a relatively large aperture.

It has been proposed heretofore to compose a photographic objective having a relatively large aperture of three axially alined lens units separated from each other by air spaces, in which the first unit, which faces the subject to be photographed, consists of a single collective lens, while the center unit consists of a meniscus-shaped unit comprising a number of lenses cemented together and having its convex face directed toward the first unit, and the third unit is collective and consists also of a number of lenses cemented together. Objectives of this type have been produced having a relative aperture up to 1:1.5 at a picture angle of approximately 45°.

The principal object of the present invention is to increase the relative aperture of the photographic objective by employing in addition to the present cemented faces one more cemented face.

Another object of the invention is to provide the additional cemented face in the third lens unit of the photographic objective of the type referred to.

The objective of the present invention therefore is composed of a single collective front lens, followed by a meniscus-shaped center unit whose convex face is directed toward the front lens, and a third or rear unit which is collective and has the particular novel feature that it consists of four individual lenses all of which are cemented together.

Still another object of the invention is to provide the photographic objective of the type mentioned with a rear unit composed of a collective lens, a dispersive lens, another collective lens and another dispersive lens, all lenses being cemented together in the order named and the first named collective lens facing the center unit.

It is also an object of the invention to make the two collective lenses of the rear unit of the photographic objective of a material having a high refractive index, while the second and fourth lens of the rear unit, namely the two dispersive lenses, are made each of a material having a refractive index which is smaller than the one of the material of which the preceding collective lens is made.

The drawing illustrates diagrammatically the outline of the axial cross section of a photographic objective in accordance with the present invention.

Referring to the drawing, the objective consists of three lens units in axial alinement and separated by air, the axial separating distances being designated with $l_1$ and $l_2$ respectively. An iris diaphragm B is positioned in the second air space. The first or front lens unit—so called because it faces the subject to be photographed—is a single collective lens $L_1$ ($d_1$). The center lens unit is a three-lens meniscus composed of the lenses $L_2$ ($d_2$), $L_3$ ($d_3$) and $L_4$ ($d_4$), all cemented together, the outer convex face $R_3$ of this unit being directed toward the front unit $L_1$ ($d_1$).

The rear lens unit, is collective and according to the present invention is composed of four lenses $L_5$ ($d_5$), $L_6$ ($d_6$), $L_7$ ($d_7$) and $L_8$ ($d_8$), all cemented together in the order named. The first lens $L_5$ ($d_5$) of this rear unit is a collective lens having a slightly concave outer face $R_7$ which faces the center lens unit. The second lens $L_6$ ($d_6$) is a bi-concave dispersive lens and is made of a material having a smaller refractive index than that of which the collective lens $L_5$ ($d_5$) is made. The third lens $L_7$ ($d_7$) is a collective lens having two convex faces $R_9$ and $R_{10}$ of which the latter, which faces the lens $L_8$ ($d_8$), has a smaller radius of curvature than the face $R_9$. The fourth lens $L_8$ ($d_8$) is a concavo-convex dispersive lens having an outer convex face $R_{11}$ whose radius of curvature is substantially larger than the one of its other cemented concave face. The lens $L_8$ ($d_8$) is made of a material having a refractive index which is smaller than the refractive index of the material of which the adjacent collective lens $L_7$ ($d_7$) is made. The refractive indices of the refractive medium of which the collective lenses $L_5$ ($d_5$) and $L_7$ ($d_7$) are made are both larger than the refractive indices of the refractive mediums the dispersive lenses $L_6$ ($d_6$) and $L_8$ ($d_8$) are made of.

This novel composition of the rear unit of the objective results in an increase of the relative aperture, and in the following the correct optical data of an objective is given having a relative aperture of 1:1.4.

Focal length f=100 mm.

| | | | nd | ν |
|---|---|---|---|---|
| $L_1$ | $R_1=+74.40$ | $d_1=9.8$ | 1.6202 | 60.3 |
| | $R_2=+756.80$ | $l_1=.24$ | | |
| $L_2$ | $R_3=+38.16$ | $d_2=11.10$ | 1.7015 | 41.1 |
| | $R_4=+79.00$ | $d_3=8.4$ | 1.4450 | 68.4 |
| $L_3$ | $R_5=-850.00$ | $d_4=2.0$ | 1.7219 | 28.1 |
| $L_4$ | $R_6=+25.45$ | $l_2=13.50$ | | |
| $L_5$ | $R_7=-740.00$ | $d_5=8.0$ | 1.6385 | 55.5 |
| $L_6$ | $R_8=-80.00$ | $d_6=1.2$ | 1.5150 | 50.0 |
| | $R_9=+58.00$ | $d_7=20.0$ | 1.6689 | 48.8 |
| $L_7$ | $R_{10}=-23.60$ | $d_8=2.6$ | 1.6102 | 56.5 |
| $L_8$ | $R_{11}=-106.94$ | | | |

What I claim is:

1. A photographic objective of large relative aperture comprising three axially aligned lens units separated from each other by air spaces, the front unit being a single collective lens, the center unit forming a meniscus curved toward said front unit which faces the subject to be photographed, and the rear unit being collective and being formed of four lenses all cemented together, the first and third lens of said rear unit being collective, while the second and fourth lens of said rear unit are dispersive, and are made each of a refractive material having a smaller refractive index than the refractive material of which the preceding first and third lens respectively of said rear unit are made, the first lens of said rear unit being arranged to face said center unit.

2. A photographic objective of large relative aperture comprising three axially alined lens units separated from each other by air spaces, the front unit being a single collective lens, the center unit forming a meniscus curved toward said front unit which faces the subject to be photographed, and the rear unit being collective and being composed of a concavo-convex lens, a bi-concave lens, a bi-convex lens and a concavo-convex dispersive lens, all of which are cemented together in the order named, the first named concavo-convex lens being collective and facing said center unit, said second and fourth lens of said rear unit being dispersive and being made each of a refractive material having a smaller refractive index than the refractive material of which the preceding first and third lens respectively, of said rear unit are made.

3. A photographic objective of large relative aperture comprising three axially alined lens units separated from each other by air spaces, the front unit being a single collective lens, the center unit forming a meniscus curved toward said front unit which faces the subject to be photographed, and the rear unit being collective and being formed of four lenses all cemented together, the first and third lens of said rear unit being collective, while the second and fourth lens of said rear unit are dispersive, and have a refractive index smaller than that of the first and third lens respectively, the face of the second lens to which the third lens is cemented having a smaller radius of curvature than the face to which the first lens is cemented, the first lens of said rear unit being arranged to face said center unit, said lens units having their radii, focal powers and axial spacings cooperatively co-related to the focal length of the objective as a whole to give larger relative aperture for the same picture angle.

4. A photographic objective of large relative aperture comprising three axially alined lens units separated from each other by air spaces, the front unit being a single collective lens, the center unit forming a meniscus curved toward said front unit which faces the subject to be photographed, and the rear unit being collective and being composed of a concavo-convex lens, a bi-concave lens, a bi-convex lens and a concavo-convex dispersive lens, all of which are cemented together in the order named, the first named concavo-convex lens being collective and facing said center unit, said second and fourth lens of said rear unit being dispersive and being made each of a refractive material having a smaller refractive index than the refractive material of which the preceding first and third lens respectively, of said rear unit are made, said lens units having their radii, focal powers and axial spacings cooperatively co-related to the focal length of the objective as a whole to give larger relative aperture for the same picture angle.

LUDWIG BERTELE.